Oct. 26, 1948.                W. V. ESLINGER ET AL                2,452,296
                                PRESSURE INDICATOR
                              Filed Aug. 22, 1944
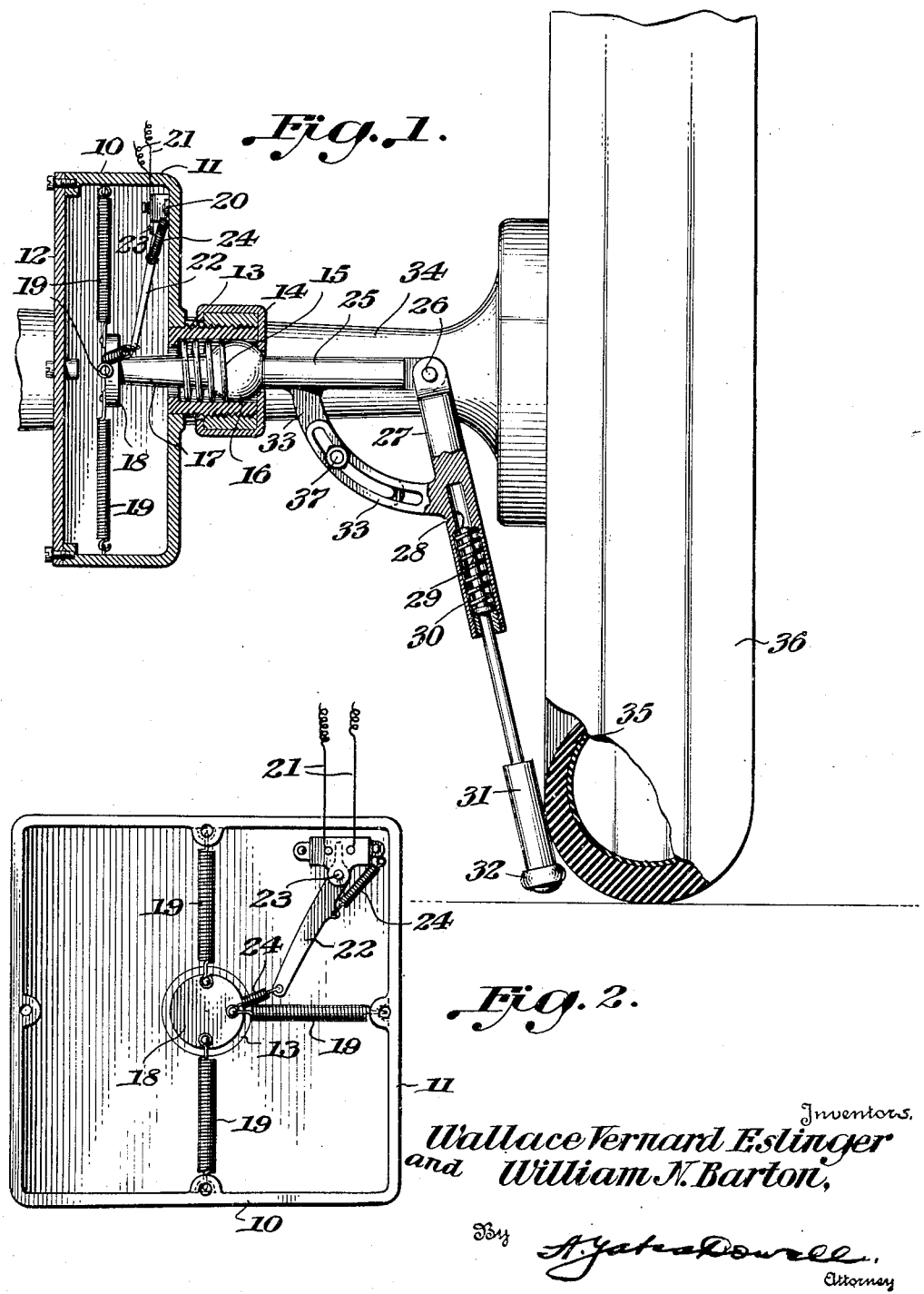
Inventors.
Wallace Vernard Eslinger
and William N. Barton,
By A. Yates Dowell,
Attorney Patented Oct. 26, 1948

2,452,296

UNITED STATES PATENT OFFICE 2,452,296

PRESSURE INDICATOR

Wallace Vernard Eslinger and William Nathaniel Barton, Arlington, Va.; said Wallace Vernard Eslinger assignor to Genevieve B. Eslinger, Falls Church, Va.

Application August 22, 1944, Serial No. 550,658

3 Claims. (Cl. 200—58)

This invention relates to pressure indicators, and more particularly to an improved pressure response mechanism for automatically and selectively indicating decreased pressure in each of the pneumatic tires in use on a vehicle.

An object of this invention is to provide a device that will instantly indicate small decreases in tire pressure. Another object is to provide an attachment for motor vehicles that may be readily adjusted to operate with vehicles already in use. A further object is to provide such a device that is selectively responsive and automatically adaptable to any condition of road surface. Other more specific objects will appear from the detailed description presented herein when contemplated in conjunction with the drawings, which represent diagrammatically in:

Figure I: A vertical cross-section view of the pressure response unit 10, in its normal neutral position.

Figure II: A rear elevation of the housing 11 with the rear cover 12 removed.

In Figure I the response unit 10 comprises a casing 11, a removable cover 12, a ball joint housing 13, having a cap 14, a ball member 16, and its retaining spring 15.

The ball member 16 is provided with a rearwardly extending shank 17, terminating in plate member 18. The ball 16, the shank 17, the plate 18, elbow 25, are all resiliently mounted by means of the spring 15, as a rigid unit for limited movement in horizontal and other planes, in the housing 13, and all resiliently held in normal neutral position by the springs 19 attached to plate 18 and the housing 11.

Conveniently attached inside the casing 11 is the switch 20, from which lead the conduits 21, clearly shown in Figure II. The switch 20 comprises an operating arm 22, pivoted at 23 and resiliently suspended in a neutral position by the springs 24, between the two contact points of the conduits 21.

Fixed to a portion of the ball 16 opposite the shank 17 is the elbow 25, to which is pivoted at 26 the arm 27. Adjusting means such as the set screw 37 and slotted arc members 33 are provided so that the arm 27 may be set at any operating angle required for the type of wheel, tire and vehicle in use.

Recessed in the lower portion of the arm 27 is the shaft 28 resiliently mounted for limited movement in a vertical plane by means of the spring 29 retained in the recess 30. On the lower end of the shaft 28 is mounted a freely rotating cylinder 31 which is preferably provided with a smooth, rounded knob-like portion 32.

The response unit 10 may be fixed to the vehicle by welding or any suitable means, or may be incorporated in the axle assembly during manufacture. Duplicate units may likewise be attached adjacent the other wheels of the vehicle. In each case the conduits such as shown in 21 on each of the mechanisms may be led in a manner well-known in the art to the dash board of the vehicle where they may be connected to individual lights or to other signalling means, audible or visible.

The response unit 10 is attached to the vehicle or to the axle 34 in a position so that the cylinder 31 is adjacent to but not quite touching the inner sidewall of the tire 35 when properly inflated, at the lower portion of the inner sidewall of the tire just above the point of traction between the tire and the road. This position of the cylinder 31 may be fixed, by adjusting the angle of the arm 27 on its pivot 26 by means of an adjusting mechanism, such as shown at 37, and 33.

When the vehicle is in operation and all tires properly inflated, the cylinder 32, the shaft 28, the arm 27, the elbow 25, the ball 16, the shank 17, and the plate 18 are all resiliently held in their normal neutral position as shown in Figures I and II.

If highway obstacles are encountered such as ruts, mud, boulders, ice, slush, sand or other obstructions, the knob 32 will ride over these obstructions by means of the vertical floating shaft 28 and the horizontal floating joint 16. Also, if after standing there is an accumulation of ice or mud on the inner wall of the tire, the resiliently mounted roller and arm 27, by means of the ball joint at 16, will likewise ride over such accumulations on the tire until they are removed by the speed of the rotation of the tire.

While the knob 32 and the rotatable cylinder 31 are contacting these obstructions or accumulations the responsive movement of the arm 27 will be transmitted through the elbow 25, the ball 16, the shank 17, to displace the plate 18, which in turn will displace the switch operating arm 22 out of its neutral position thereby completing the circuit in the switch 20 between the conduits 21 which will in turn transmit the current to the light or signal on the dash board to which they are connected, in a series of intermittent flashes or signals.

When the pressure in the tire 35 decreases the side wall will bulge and come into constant contact with the cylinder 31 which will continually hold the arm 27, the elbow 25, the shank 17, and the plate 18, out of their neutral position, thereby keeping the electric circuit constantly closed in the switch 20 and the conduits 21, causing the corresponding light on the dash board of the vehicle to remain steadily illuminated without any intermittent flashing or if an audible signal is preferred, it will remain constant without interruption. In every case the spring 15, 19, 24 and 29, will return the response unit to normal position when the conditions described are removed.

It is apparent that adjustable extension means may be incorporated in the arm 27 or in the shaft 28, so that the roller 31 may be fixed in its proper position for any type of vehicle or wheel. This adjusting means may take the form of straight interengaging slotted members (not shown) similar to the arcuate members shown at 33, which may be fixed in their adjusted position by a set screw similar to that shown at 37. It is also apparent that adjustable brackets may be used for attaching the unit to the vehicle, so that the roller 31 may be properly positioned as described herein.

The housing 13, and the recess 30 if desired may be sealed and filled with oil or non-freezing brake fluid on larger size units. This eliminates trouble from rust or dust and insures longer life.

When the present device is used on double tires it is applied so as to contact the innermost of the two or more tires. It has been found by tests that any decrease in pressure in the outside tires will instantly throw enough load on the companion tires to cause enough bulge to actuate the herein described indicator. Tests on heavy duty trucking tires have shown that the present invention will indicate decreases of less than five pounds in tire pressure.

While we have herein described our improved pressure indicator in detail with respect only to one preferred embodiment thereof, we do not contemplate limitation thereto, but intend to include all forms and modifications thereof within the scope and spirit of the appended claims.

We claim:

1. In a wheeled vehicle having pneumatic tires, a tire deflation indicator comprising a deflation response unit adapted to be mounted on said vehicle adjacent one of its wheels, said unit comprising tire contacting means normally positioned to be engaged by the inner side wall of the tire on said wheel when under-inflated at an area adjacent the point of traction between said tire and the ground, primary supporting means holding said contacting means for resilient limited axial movement in one plane, secondary supporting means holding said primary supporting means for resilient limited movement in other planes, a switch arm arranged in operating engagement with said secondary supporting means and normally held in neutral position, whereby any movement of said secondary means out of its normal position caused by tire deflation will move said switch arm out of its neutral position and into an indicating circuit closing position.

2. An attachment for a wheeled vehicle having pneumatic tires, a tire deflation indicator comprising a deflation response unit adapted to be mounted on said vehicle adjacent one of its wheels, said unit comprising tire contacting means normally positioned to be engaged by the inner side wall of the tire on said wheel at an area adjacent the point of traction between said tire and the ground, when said tire is under-inflated, primary supporting means holding said contacting means for resilient limited axial movement in one plane, secondary supporting means holding said primary supporting means for resilient limited movement in other planes, a switch arm mounted in operating engagement with said secondary supporting means and normally resiliently held in neutral position, whereby any movement of said secondary means out of its normal position caused by tire deflation will move said switch arm out of its neutral position and into an indicating circuit closing position.

3. The combination described in claim 2 that includes means for adjusting the operating angle of said primary supporting means.

WALLACE VERNARD ESLINGER.
WILLIAM NATHANIEL BARTON.

REFERENCES CITED

The following references are of record in the file of this patent:

UNITED STATES PATENTS

| Number | Name | Date |
|---|---|---|
| 1,198,688 | Young | Sept. 19, 1916 |
| 1,947,760 | Denhart | Feb. 20, 1934 |
| 2,057,445 | Prospero | Oct. 13, 1936 |
| 2,191,205 | Rogers | Feb. 20, 1940 |
| 2,258,334 | Miller | Oct. 7, 1941 |
| 2,324,618 | Dietrich | July 20, 1943 |

FOREIGN PATENTS

| Number | Country | Date |
|---|---|---|
| 280,483 | Germany | Nov. 9, 1913 |